J. KEAGY.
MACHINE FOR FEEDING AND CUTTING CLOTH, PAPER, OR OTHER MATERIAL.
APPLICATION FILED APR. 4, 1912.

1,078,202.

Patented Nov. 11, 1913.
2 SHEETS—SHEET 1.

Witnesses:

Joseph Keagy Inventor

J. KEAGY.
MACHINE FOR FEEDING AND CUTTING CLOTH, PAPER, OR OTHER MATERIAL.
APPLICATION FILED APR. 4, 1912.
1,078,202.
Patented Nov. 11, 1913.
2 SHEETS—SHEET 2.
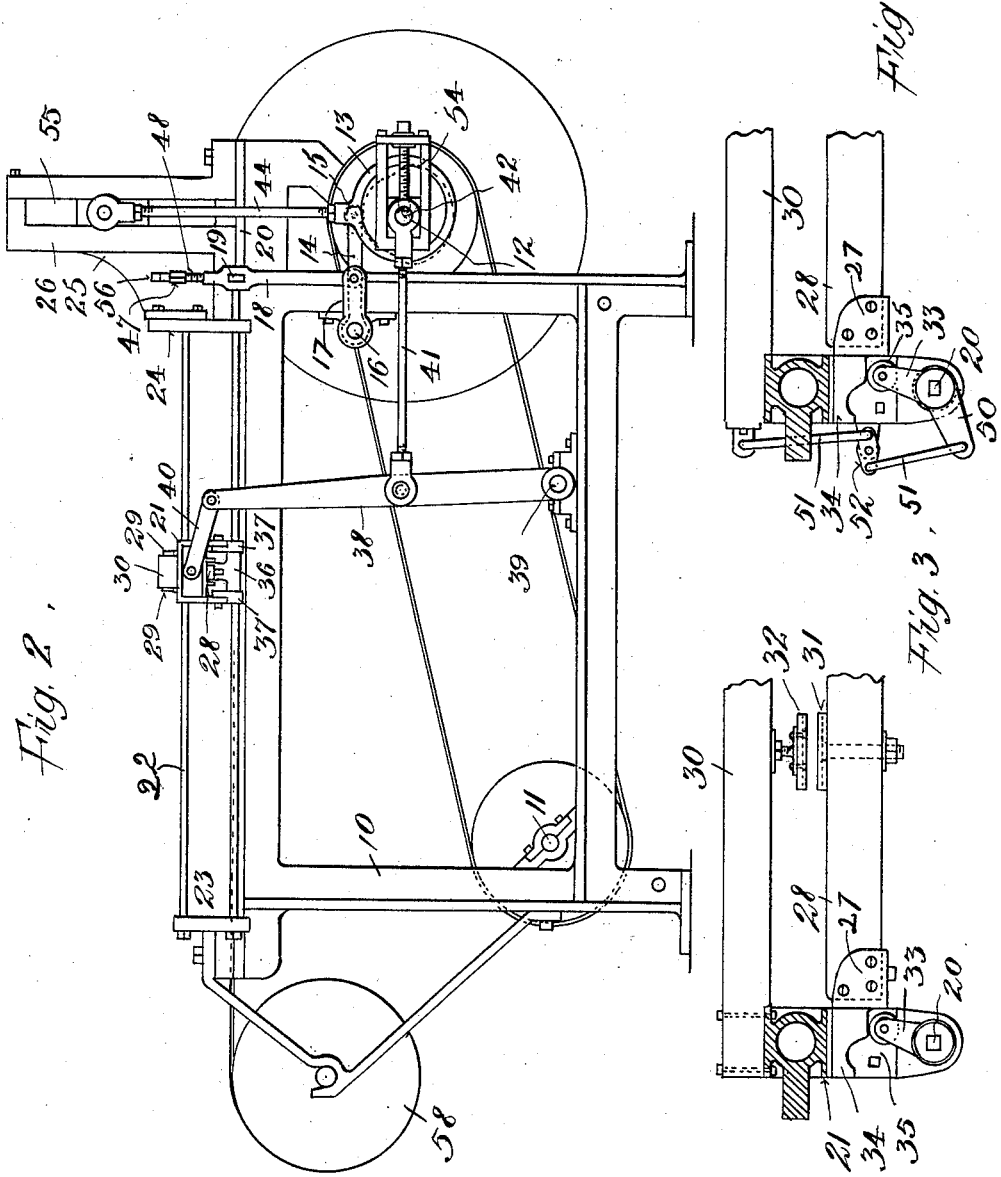

UNITED STATES PATENT OFFICE.

JOSEPH KEAGY, OF COSHOCTON, OHIO.

MACHINE FOR FEEDING AND CUTTING CLOTH, PAPER, OR OTHER MATERIAL.

1,078,202.  Specification of Letters Patent.  Patented Nov. 11, 1913.

Application filed April 4, 1912. Serial No. 688,388.

*To all whom it may concern:*

Be it known that I, JOSEPH KEAGY, a citizen of the United States, residing at Coshocton, county of Coshocton, State of Ohio, have made a certain new and useful Invention in Machines for Feeding and Cutting Cloth, Paper, or other Material, of which the following is a specification.

This invention relates to machines for feeding and cutting cloth, paper or other material.

The object of the invention is to provide a construction of apparatus for feeding and cutting sheets or strips of material, such as cloth, paper, or the like, which is simple in construction, efficient in operation and economical to manufacture.

A further object of the invention is to provide a machine of the character and for the purpose described, wherein is embodied feeding means for the sheet or strip of material to be operated upon, adapted to intermittently grasp or clamp and release the sheet or strip or material and advance the same, the gripping means releasing their grip upon the material or sheet to be fed at the forward limit of movement of the gripper mechanism, and such mechanism then being returned toward the opposite limit of its movement to gain a fresh grasp or grip upon the material to be fed.

Other objects of the invention will appear more fully hereinafter.

The invention consists substantially in the construction, combination, location and arrangement of parts, all as will be more fully hereinafter set forth, as shown in the accompanying drawings, and finally pointed out in the appended claims.

Figure 1:
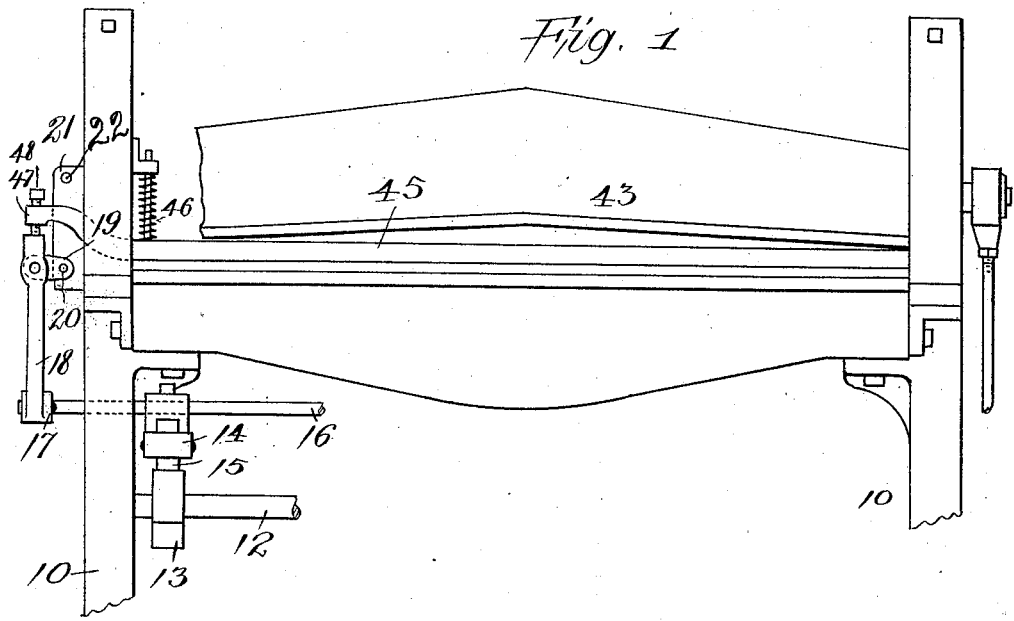
Figure 4:
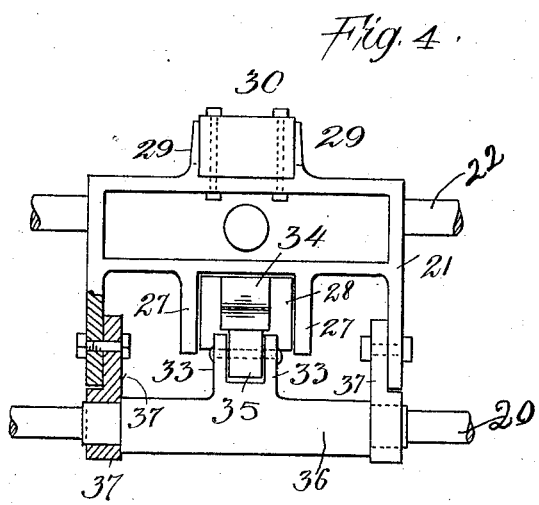

Referring to the accompanying drawings, and to the various views and reference signs appearing thereon,—Figure 1 is a view in front elevation of a machine embodying my invention, parts broken out on the left hand side to disclose more clearly the mechanism for raising and lowering the pressure bar. Fig. 2 is a view in side elevation of the same. Fig. 3 is a detail view, partly in section, showing the gripper jaws and the means employed for moving the same toward and from each other to clamp or release the material to be fed. Fig. 4 is a broken detail view in side elevation of the construction shown in Fig. 3. Fig. 5 is a view similar to Fig. 3 showing a slightly modified arrangement embodying the principles of my invention.

The same part is designated by the same reference numeral wherever it occurs throughout the several views.

One of the important features and characteristics of the machine embodying my invention is the provision of gripper jaws mounted upon or constituting parts of a carriage adapted to reciprocate intermittently back and forth, and which are closed upon each other, at the rear limit of travel of the carriage, so as to grip between them the sheet or strip of material to be operated upon, and are separated from each other, at the forward limit of travel of the carriage, so as to release the grip exerted thereby upon the sheet or strip of material. The carriage is mounted and caused to reciprocate forward and backward in suitable guides provided for that purpose.

Another feature of importance is the provision of a presser bar which is located near the front end of the machine and close to the vertical line of operation of the cutter, die, or other tool, employed in connection with the operation of the machine, and which presser bar extends transversely across and above the sheet or strip being fed and cut, or otherwise operated upon and is pressed down thereon during the operation of the cutter, die, or other tool, and during the time the gripper jaws are released from gripping engagement upon the sheet or strip. The presser bar is yieldingly pressed down upon the strip, but is raised from contact with the strip or sheet, and maintained in raised position during the time the gripper jaws are clamped upon and are moving forward to feed the sheet or strip of material.

Other special features and characteristics of the machine will be more fully explained hereinafter.

Referring to the accompanying drawing, I provide a suitable framework 10, in which is suitably journaled a drive shaft 11, to which rotation is imparted from any convenient or suitable source of power. At the front end of the machine, and extending transversely across it, is a countershaft 12, driven by any suitable drive connection from the main shaft 11. Upon shaft 12 is mounted a cam 13, upon the cam surface of which bears one end of a lever 14. If desired, the lever 14, may be provided with a roller 15, in its end to take the bearing contact with the cam. The lever 14, is mounted upon a rock shaft 16, which is journaled to rock and is arranged to extend transversely across the machine. Periodic rocking movement is imparted to shaft 16 when the lever 14, is rocked by the cam 13. At its ends the rock shaft 16 is provided with arms 17, to which are connected vertical links 18, which at their upper ends are connected to crank arms 19, on rock shafts 20, the latter extending longitudinally of the machine and each constituting one of a pair of guides at each side of the machine for the feeding carriage 21. The other member of each pair of carriage guides, at each side of the machine, is in the form of a rod which extends longitudinally of the machine, and in parallel relation with reference to the rock shaft 20. Thus each rod 22, and its associated rock shaft 20, constitute a guide for one end of the carriage. It will be understood, of course, that there is a pair of such guides at each side of the machine. The two carriage guides 20 and 22 are supported at their rear ends in a bracket 23, carried by the main frame 10, and at their front ends the guides 20, 22, are carried by a bracket 24, bolted onto an extension 25, of the housing 26, in which the cutter, die or other tool head operates.

The operation of the construction so far described is that when rotations are imparted to the shaft 12, the links 18, one at each side of the machine, are vertically reciprocated by the cam 13, which imparts rocking movements to the rock shaft 16, and this, in turn, through the arms 17, one at each end thereof, imparts a vertical reciprocation to the rods 18, thereby rocking the guide shafts 20. The rocking guide shaft should preferably be made in the form of a spline shaft, or may be made square, hexagonal, or other shape in cross section, or otherwise formed, so that the rocking movements imparted thereto may be employed for the further operations presently to be described more fully.

The carriage 21, is in the form of side or end castings which are mounted to be supported and to slide on the guide rods 20 and 22, at each side of the machine. Each casting is provided with guide projections 27, forming a seat to receive the end of a bar 28, this being the lower member of a pair of bars which extend transversely across the machine, and above it, and carry the gripper jaws. Each carrier casting is also formed with upper guides 29 forming a seat to receive the ends of the upper member 30, of the gripper jaw support. Supported upon the members 29, 30, at a point preferably the mid width of the machine, are the gripper jaws 31, 32. One or both of these gripper jaws may be made adjustable so as to regulate their space or distance apart. The sheet or strip of material to be fed is designed to pass between the gripper jaws 31, 32. The lower member 28, carrying the jaw 31, is mounted for vertical movement toward and away from the upper member 30, for the purpose of effecting the clamping and releasing action of the gripper jaws with reference to each other and the material to be fed. This vertical movement of the member 28, is secured by means of a crank arm 33, mounted on the guide rod 20, and engaging a bearing plate 34, bolted or otherwise secured to the end of the lower gripper jaw supporting member 28, as clearly shown in Figs. 3 and 5. If desired, the crank arm 33, may carry a roller 35, to take the wearing contact with the bracket 34. In order to lock the gripper jaw supporting member 28, in its raised or clamping position, I propose to arrange the crank arm 33 so as to pass beyond the vertical dead center line of the axis of rocking shaft 20, thereby constituting in effect a dead center lock to retain the lower gripper jaw raised.

If desired, the gripping or clamping surfaces of the gripper jaws may be serrated, roughened, or otherwise formed, so as to insure an efficient clamping or gripping action on the sheet or strip of material to be fed.

In the operation of the machine the gripper mechanism carriage moves from one extreme limit of movement thereof to the other during the period the gripper jaws are clamped upon the sheet to be fed. This might impose an undue wear and strain upon the rock shaft 20. To avoid this I form the crank arm 33, with a sleeve 36 of extended length, as shown most clearly in Fig. 4, and which sleeve, at its ends, is journaled in hangers 37, bolted to the carriage frame casting 21. Since the principal weight of the carriage, and the part supported by it, is carried by the upper guide rod 22, it will be seen that the strain imposed on the crank arms 33, when performing their functions of raising the lower gripper jaw support and of maintaining the same raised, is relieved from the rock shaft 20, and is distributed through the casting 21, of the carriage and thence to the upper supporting guide rod 22, thereby relieving the shaft 20, of said strain.

The cam 13, is so proportioned and constructed as to raise the lower gripper jaw supporting member 28, automatically at the extreme rear limit of travel of the carriage so as to grip the sheet of material to be fed and to maintain the gripping relation thereof throughout the entire forward movement of the carriage, and then to automatically release the gripping jaws to permit them to separate and to remain separated or released during the entire return stroke of the carriage.

Where the machine is intended for use in cutting cloth, or for other similar purposes, for instance, I propose to extend the crank arm 33, to the opposite side of the axis of guide rod 20, as shown at 50, Fig. 5, and to connect the extended end thereof by means of intermediate rods 51, and bell crank lever 52, or other suitable connections, with the ends of the upper gripper jaw supporting member 30, so that when the lower member 28, is raised the upper member 30, is lowered coincidently; and, similarly, when the lower member is lowered the upper member is simultaneously raised. This secures a more rapid operation of the gripping jaws while at the same time permitting a corresponding decrease in the projection or extent of projection of the cam surface of cam 13, consequently decreasing the extent of throw effected by the cam. This is desirable in many cases according to the uses to which the machine is to be put. The movement of the carriage along the guide rods 20, 22, may be effected in many different ways. A simple arrangement is shown which has been found to be practical and simple, as well as efficient, which comprises a rock lever 38, mounted to rock on a shaft 39, journaled transversely in the main plane 10, of the machine. The rock lever 38 is connected at its upper end by means of a link 40, to the feed carriage casting 21, it being understood that a rock lever 38 is provided at each end of the rock shaft 39, and that each rock lever 38, is similarly connected to a gripper carriage casting 21. The levers 38 are rocked in timely periods by means of a connecting rod 41, pivotally connected to one of said levers 38, and connected at its opposite end as at 42, to a wrist pin mounted adjustably in a track or guide way formed in a face plate 54 mounted upon the shaft 12. By adjusting the wrist pin diametrically across the face plate the length of throw of the connecting rod 41, may be adjustably regulated, thereby regulating the travel of the gripper jaw carriage.

At the front end of the machine are mounted the housings 26, one at each side of the machine, and in these housings are carried and guided, for vertical movement, the cutter heads, dies, or other tools employed in connection with the desired operation on the strip of material fed through the machine. In the case of paper sheets intended to be cut off in uniform lengths, the head would carry a cutter plate 43. If other work is to be done the cutter 43, would be replaced by a suitable die or other tool. I do not desire therefore to be limited or restricted to the use to which the machine is to be put, nor to the particular structure employed for operating on the sheet of material that is to be fed.

Where a cutter, or other vertically reciprocating tool is employed, the ends of the head are extended through vertical guide slots 55 in the housings 26, and the vertical reciprocations thereof are accomplished in any suitable or convenient manner, as, for instance, by means of connecting rods 44, operated from cranks on the shaft 12. The operation is properly timed with reference to the feeding operations or movements of the feed carriage and clamping jaws.

Where a vertically reciprocating die or cutter head is employed a presser bar 45, is preferably used which extends transversely across the machine and above the sheet of material being fed and in close proximity to the vertical plane of operation of the cutter or die head. This presser bar is normally held down yieldingly upon the surface of the material by springs 46, or otherwise. It is necessary, however, that the presser bar be in clamping action upon the strip of material being fed only during the period that the gripper jaws of the feed carriage are realesed from clamping relation with reference to the material to be fed and also during the period that the carriage is being returned to its initial starting position to clamp and advance the strip of material through the machine. Consequently it is necessary that the presser bar be automatically raised and maintained in raised relation so as to release the strip of material during the period of time the gripper jaws are advancing with the strip of material clamped therebetween. In order to accomplish this result the ends 47, of the presser bar extend through vertical slots 56 in the extensions 25, of housings 26, and at their outer ends they carry adjustable screws 48, arranged in vertical line with the reciprocating rods 18, through which rocking movement is imparted to the guide shaft 20, so that when said rods 18, are moved vertically to rock shaft 20, in a direction to cause a gripping action of the gripper jaws the same movements cause rods 18 to engage the screws 48, thereby raising the presser bar, and when the rods 18, are moved downwardly, which movement would result in opening up the clamping jaws, the ends 47 of the presser bar are released or the supports therefor withdrawn and the springs 46 thereupon cause the presser bar to again descend upon the surface of the strip of material to clamp and hold the same during the period of time the carriage with the gripper jaws is returning to its initial position, and the gripper jaws are released from clamping action upon the strip of material to be fed.

It will be observed from the foregoing description that I provide an exceedingly simple and efficient construction of machine for intermittently feeding sheets or strips of material. It will, of course, be understood that it is immaterial in what form the material to be fed may be supplied to the machine. While therefore I have shown the material as carried upon a roll 58 at the rear end of the machine my invention, as defined in the claims, is not to be limited or restricted in this respect. It will also be understood, as above intimated, that my invention is not to be limited or restricted in respect to the use to which it is to be put. I have found it very practical and efficient for use in cutting up cloth into desired predetermined uniform lengths; also, for use in cutting paper sheets into desired lengths, but it is obvious that it is equally well adapted for use for other purposes.

It will also be understood that the gripper jaw feeding carriage is substantially supported upon the upper guide rod 22, so that the rock shaft 20, which operates the lever through which the gripping or clamping action of the gripper jaws is controlled, is relieved of undue or unnecessary strain upon it by reason of any weight or pressure resulting from the operation of such lever.

Many variations and changes in details of construction and arrangement would readily occur to persons skilled in the art and still fall within the spirit and scope of my invention. I do not desire, therefore, to be limited or restricted to the exact details of construction shown and described. But Having now set forth the object and nature of my invention, and constructions embodying the principles thereof, and having described such constructions, their purpose, function, and mode of operation, what I claim as new and useful and of my own invention, and desire to secure by Letters Patent, is:—

1. In a machine for feeding and cutting sheets or strips of material, a framework, a carriage extending transversely thereacross, means for intermittently reciprocating said carriage longitudinally of the machine, a guide rod arranged at each side of the machine for supporting said carriage, and also constituting a guide for guiding said carriage in its longitudinal reciprocating movement; a rock shaft arranged at each side of the machine and parallel to said guide rods, a sleeve journaled upon the said rock shaft to rock or swing therewith when the latter is rocked, upper and lower gripper jaws between which the material to be fed is led, a crank arm connected to said sleeve and arranged to operate said clamp jaws to open and close them with respect to each other at the limits of the longitudinal reciprocations of the feed carriage, and means for periodically rocking said rock shaft.

2. In a machine for feeding and cutting sheets or strips of material, a framework, a guide rod arranged at each side of the framework and extending longitudinally thereof, a carriage extending transversely across the machine and engaging said guide rods to move therealong, a depending bracket supported by each end of the carriage, a sleeve journaled in each depending bracket, a crank arm on said sleeve, a rock shaft along which said sleeve moves, and having connections therewith whereby when said rock shaft is rocked said sleeve is also rocked, clamping jaws mounted on said carriage, connections between said crank arm and jaws whereby when said rock shaft is rocked, said jaws are moved apart or closed upon each other, means for intermittently reciprocating said carriage along said guide rod, and means for coöperatingly rocking said rock shaft intermittently.

3. In a machine for feeding and cutting sheets or strips of material, a framework, a guide rod arranged at each side thereof and extending longitudinally of the machine, a carriage having castings at each end thereof arranged to be supported and to be guided by said guide rod, and having seats, transversely extending bars received at their ends in said seats, clamping jaws carried by said clamp bars, and presented toward each other and disposed so as to permit the material to be fed to pass between them, a depending bracket carried by each casting, a sleeve journaled at its ends in said bracket and having a crank arm, a spline shaft over and upon which said sleeve moves and having connection therewith whereby when said rock shaft is rocked said sleeve is also rocked, a bracket connected to one of said transverse clamp bars and arranged to be engaged by said crank arm, whereby when said crank arm is rocked said clamp bar is raised or lowered, means for intermittently reciprocating said carriage along said guide rods and means for coöperatingly rocking said rock shaft.

4. In a machine for feeding and cutting sheets or strips of material, a framework, a guide rod arranged on each side thereof and extending longitudinally of the same, castings at opposite sides of the machine, said castings mounted to be supported upon and to slide along said guide rods, and having seats therein, transversely extending bars seated at their ends in said seats, clamp jaws carried by said transverse bars and arranged and so disposed as to permit the material to be fed to pass between them, a casting connected to the ends of one of said bars, a sleeve having a crank arm coöperating with a cam surface on said last mentioned casting, a rock shaft upon which said sleeve is carried and slides, said crank arm being in vertical line with the axis of said rock shaft when in position to release the clamp jaws and out of such vertical line when the clamp bar is raised to clamp the clamp jaws together, whereby, in its clamped relation said bar is locked, means for intermittently reciprocating said carriage along said guide rod, and means for coöperatingly rocking said rock shaft.

5. In a machine for feeding and cutting sheets or strips of material, a framework, guides arranged at each side thereof and extending longitudinally of the frame, and including a rocking member, a carriage connected at its ends to said guides, gripper jaws mounted on said carriage, connections between said rocking member and said jaws to relatively move the latter, a rock shaft extending transversely of the machine frame, and having rock levers at each end thereof, links connecting said rock levers to the ends of said carriage and means for rocking said levers intermittently.

6. In a machine for feeding or cutting sheets or strips of material, a framework, guides arranged at each side thereof and extending longitudinally of the machine and including a rocking member, a carriage connected at its ends to said guides for movement therealong, gripper jaws mounted on said carriage, connections between said rocking member and said jaws to relatively move the latter, a transversely extending shaft, rock arms connected thereto at its ends, links connecting said rock arms to the ends of said carriage, and adjustable connections for rocking said arms.

7. In a machine for feeding and cutting sheets or strips of material, a framework, longitudinally extending guides at each side thereof, a carriage having supporting and guiding connection with said guides, clamp jaws carried by said carriage, a main drive shaft, a counter shaft driven therefrom, an adjustable wrist pin mounted upon said counter shaft, connections actuated thereby for reciprocating said carriage along said guide, a cam also mounted upon said counter shaft, and means operated by said cam for opening and closing said gripper jaws.

8. In a machine for feeding and cutting sheets or strips of material, a framework, longitudinally extending guides arranged at each side thereof, and including a rock shaft, gripper jaws carried by said carriage, connections between said gripper jaws and rock shaft whereby when said rock shaft is rocked said gripper jaws are actuated to close upon or open from each other, a main drive shaft, a counter shaft driven therefrom, a cam mounted upon said counter shaft, and connections actuated thereby for periodically rocking said rock shaft, an adjustable wrist pin also carried by said counter shaft, rock levers connected to said carriage to reciprocate the same, and connection between the said rock shaft and adjustable wrist pin for actuating the latter.

9. In a machine for feeding and cutting sheets or strips of material, a framework, longitudinally extending guides at each side thereof, a carriage supported and guided upon said guides, gripper jaws mounted on said carriage, means for intermittently reciprocating said carriage upon said guides, means for intermittently opening and closing said gripper jaws with reference to each other, and including a rock shaft, a rod for rocking said shaft, means for periodically operating said rod, a presser bar coöperating with said clamping jaws and having its ends arranged to extend into position over said actuating rods, whereby when said rods are operated to release the gripper jaws, the pressure bar is permitted to act upon the material to be fed, and when said rods are operated to clamp said jaws upon the material said presser bar is raised out of engaging relation with respect to the material to be fed.

10. In a machine for feeding and cutting sheets or strips of material, a framework, longitudinally extending guides arranged at each side thereof, and including a rod and a rock shaft, a carriage supported at its ends upon said guide rods and operating along said rock shaft, a main drive shaft, a counter shaft driven therefrom, means operated by said counter shaft for intermittently reciprocating said carriage, gripper jaws mounted on said carriage, means operated by said rock shaft for opening and closing said jaws, means also operated from said counter shaft for intermittently rocking said rock shaft to open and close said gripper jaws, a tool head mounted to reciprocate vertically across the line of feed or travel of the material, and means also operated by said counter shaft for actuating said reciprocating head.

11. In a machine for feeding and cutting sheets or strips of material, a framework, guides extending longitudinally thereof at each side, a carriage extending transversely across the machine and supported and guided by said guides, gripper jaws carried by said carriage, a tool head mounted to reciprocate vertically at the end of the framework, a presser bar interposed between the cutter head and the feed carriage, a shaft, means for driving the same, a wrist pin for reciprocating said carriage, a cam for operating said gripper jaws and presser bar and an eccentric operating said tool head, said eccentric and cam being mounted upon said shaft.

In testimony whereof I have hereunto set my hand in the presence of the subscribing witnesses, on this 12th day of March A. D., 1912.

JOSEPH KEAGY.

Witnesses:
  BERNICE KEAGY,
  C. C. DAWSON.

Copies of this patent may be obtained for five cents each, by addressing the "Commissioner of Patents, Washington, D. C."